Patented Jan. 27, 1942

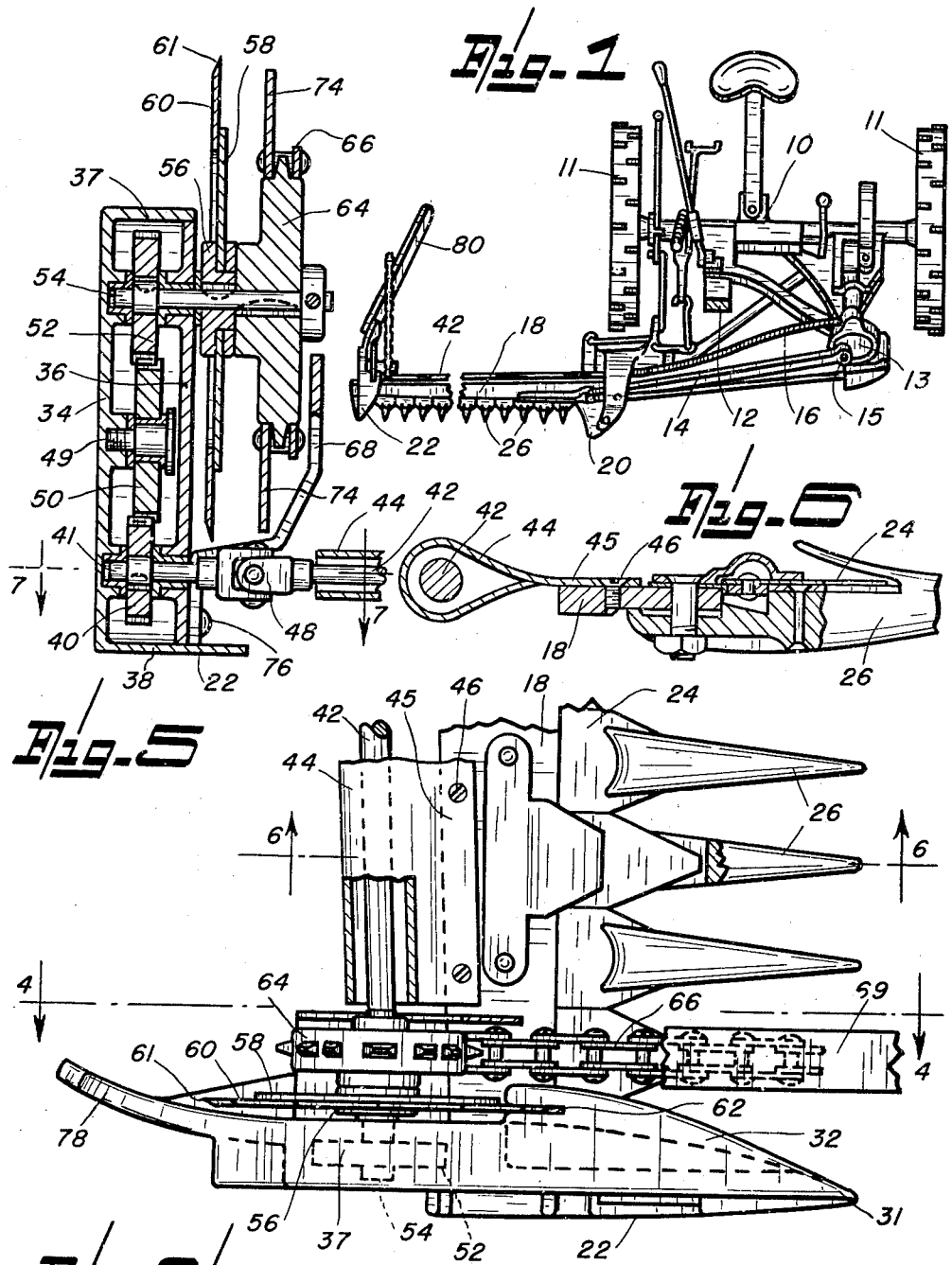

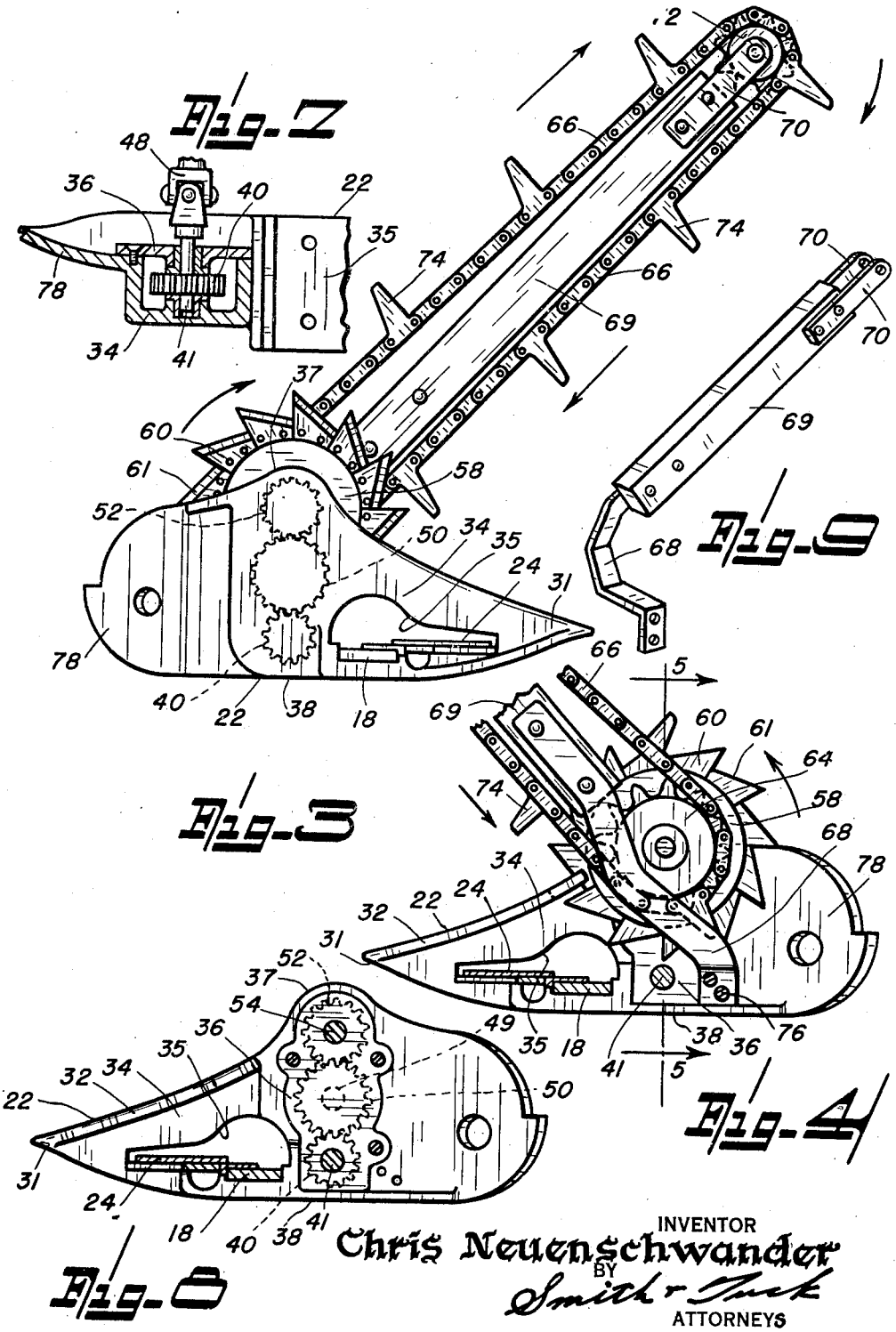

2,270,890

UNITED STATES PATENT OFFICE 2,270,890

HARVESTER MECHANISM

Chris Neuenschwander, Seattle, Wash.

Application December 6, 1940, Serial No. 368,833

5 Claims. (Cl. 56—315)

This invention relates to improvements in a harvester mechanism of the type employed for cutting vegetable growth in fields wherein a cutter mechanism is passed over the crop being harvested to shear the stalks from the roots and to lay them on the ground.

A common difficulty experienced by most all farmers relates to the operation of their mowing or harvesting mechanism in the field where often the condition of the crop is such that at the outer end of the cutter bar a clean cut is impossible because the crop overlays the cutter end and yet is not cut leaving a jagged and wavy edge that makes difficult the cutting of a succeeding round.

An important object of my invention is the provision of supplementary cutter means for the outboard end of harvester mechanism whereby the crop at the edge of the round being cut is sheared vertically in a clean and neat manner.

Another important object of my invention has been to provide a rotary cutter mechanism for the outboard end of a mower cutter bar, and said rotary cutter being provided with drive means independent of the means employed to operate the sickle.

A further object of my invention is the provision of a rotary shear for the outboard end of a mower cutter bar wherein is also incorporated crop gathering means for insuring the presentation of all overlying vegetable growth to the rotary shear.

A still further object of the invention has been to provide a rotary shear operable in conjunction with the outboard shoe of a reciprocating cutter type mowing mechanism wherein the shoe provides a fixed edge for the shear to operate against in its rotary motion.

Still another object of my invention has been the provision in combination with a rotary shear of crop gathering means for feeding material to the shear which gathering means employs an endless belt of conventional construction and provided with traveling fingers for engaging the vegetable material encountered.

Other important objects of my invention will be apparent during the course of the following description wherein I have described by reference to the attached drawings a preferred form of my invention. In the drawings one form of my invention is illustrated but it will be understood that this form is merely exemplary and that changes and alterations may be made within the scope and import of the subjoined claims.

In the drawings, where like reference numerals refer to like parts through the same, Figure 1 is reduced view as from the front of a harvester mechanism, commonly referred to as a mower, of the type to which my invention is shown attached and incorporated.

Figure 2 is an enlarged plan view of a fragmentary portion of the outboard end of a cutter bar of the type shown in Figure 1, Figure 3 is an end elevational view of the outboard shoe of a cutter bar and illustrating the rotary shear and crop gathering mechanism associated therewith, Figure 4 is a sectional, elevational view as though taken on line 4—4 of Figure 2, Figure 5 is a vertical, sectional view taken on the lines 5—5 of Figure 4, Figure 6 is a fragmentary sectional view taken along lines 6—6 of Figure 2, Figure 7 is a horizontal sectional view of the showing of Figure 5 as though cut on lines 7—7, Figure 8 is an inner face view of the outboard shoe of a cutter mechanism, and Figure 9 is a perspective view of the arm employed in connection with the outboard shoe for supporting the crop gathering mechanism above and in advance of the cutter shear and cutter bar.

The reference numeral 10 indicates a carriage for a mower having the ground engaging members 11 which support the carriage members. As the wheels are advanced over the ground by the application of a draft means to the draw bar 12 they are rotated and the rotary motion on their axle (not shown) is converted through gears into right angular motion in the head 13 to reciprocally operate the pitman 14. The pitman is fastened to the head by means of an eccentric pin 15. Power is also applied to rotate or turn the flexible shaft 16 in a conventional manner and forming no part of this invention the details of which are therefore not shown.

Supported ahead of and to the side of the wheels and the carriage is the cutter bar 18 which has the inner ground shoe 20 and the outer ground shoe 22. A reciprocable sickle 24 is mounted on the cutter bar 18 to cooperate with a plurality of finger guards 26 and is caused to reciprocate through the instrumentality of the pitman 14.

The outer ground shoe 22 is provided with a nose 31 and rearwardly extending therefrom is the overlying flange 32. Below the flange in the wall 34 is the opening 35 in which the outer end of the sickle 24 is reciprocated. The cutter bar 18 is also attached to the shoe 22 in the opening 35. Between the wall 34 and the detachable plate 36 which together with the upper wall 37 and the lower ground engaging wall 38 form a gear case, I mount for rotation the pinion 40 on the shaft 41 which is suitably journalled in the walls 34 and 36. Power is transmitted to the pinion 40 from the flexible shaft 16 by means of the drive shaft 42 that is coupled thereto.

The drive shaft 42 extends across the cutting space of the sickle behind the cutter bar in the approximate plane indicated in Figure 6. A thin metal shield 44 comprising a streamline loop having a forwardly extending flange 45 is secured to the cutter bar 18 by means of the bolts 46. A flexible coupling 48 is interposed between the shaft 42 and the shaft 41 to allow for a variation in the axis of rotation of those two elements.

By means of the bolt 49 which forms a stub shaft I mount the idler pinion 50 in alignment with the pinion 40 and the driven pinion 52 also meshes with the gear 50. The pinion 52 is keyed to the shaft 54 that is journalled in the walls 34 and 36 and extends outwardly from the gear casing in the manner clearly shown in Figure 5. A hub 56 is keyed to the shaft 54 and carries for rotation thereon the flange 58 that is roughly circular in shape and has, around its periphery, a plurality of sickle blades 60. Each blade has angularly disposed cutting faces 61. The flange 32 in its upward and rearward extension is provided with a slot 62 that is aligned with the path described by the sickle blades 60 and as the blades and their cutting edges pass through the slot 62 a shearing action obtains.

A sprocket 64 is also keyed to the shaft 54 and its teeth engage in the spaces between the links of a chain 66. On offset bracket 68 disposes the supporting arm 69 forwardly and upwardly from the rotary shear. Between arms 70 of the open fork I mount the sprocket 72 in line with the sprocket 64. At spaced points along the chain 66 I provide a plurality of crop gathering fingers 74 which are caused to travel in a path indicated by the arrows in Figure 3. Rear fingers engage vegetation and draw it into a position against slot 62 where it may be sheared by the rotary sickle cooperating therewith. The offset arm 68 is secured to the shoe 22 by means of bolts 76.

The rear end of the shoe 22 has a curved deflecting vane 78 to which is attached the arm 80 that assists in deflecting the cut crop behind the sickle and tends to form it into a windrow.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. In a harvesting machine of the type wherein cutter mechanism having supporting shoes is advanced over the surface of the ground, auxiliary edge-cutting mechanism comprising a gear case mounted in a supporting shoe, a train of gears in said gear case, means for rotating said gears, a shaft driven by said gears, a rotary sickle mounted on said shaft and driven thereby, means on said shoe cooperating with said rotary sickle to cut vegetation presented thereto, an upwardly extending supporting arm on said shoe, a sprocket adjacent each end of said supporting arm, means common with the driving means for said sickle for driving one of said sprockets, an endless chain encircling said sprockets, and crop gathering fingers on said chain adapted to pass close to said rotary sickle.

2. In a harvesting machine of the type wherein cutter mechanism having supporting shoes is advanced over the surface of the ground, auxiliary edge-cutting mechanism comprising a rotary sickle mounted for rotation on one side of a supporting shoe, means on the side of said shoe cooperating with said rotary sickle to cut vegetation presented thereto, an upwardly extending supporting arm on said shoe, a sprocket adjacent each end of said supporting arm, means for driving one of said sprockets, an endless chain encircling said sprockets, and crop gathering fingers on said chain adapted to pass close to said rotary sickle.

3. In a harvesting machine of the type wherein cutter mechanism having supporting shoes is advanced over the surface of the ground, auxiliary edge-cutting mechanism comprising a rotary sickle mounted in a supporting shoe, a shear edge on said shoe cooperating with said rotary sickle to cut vegetation presented thereto, an upwardly extending supporting arm on said shoe, a sprocket adjacent each end of said supporting arm, means for driving one of said sprockets, an endless chain encircling said sprockets, and crop gathering fingers on said chain adapted to pass close to said rotary sickle.

4. In a harvesting machine of the type wherein cutter mechanism having supporting shoes is advanced over the surface of the ground, auxiliary edge-cutting mechanism comprising a rotary sickle mounted in a supporting shoe, means on said shoe cooperating with said rotary sickle to cut vegetation presented thereto, an upwardly extending supporting arm on said shoe, a sprocket adjacent each end of said supporting arm, means for driving one of said sprockets, an endless chain encircling said sprockets, and crop gathering fingers on said chain adapted to pass close to said rotary sickle.

5. In a harvesting machine of the type wherein cutter mechanism having supporting shoes is advanced over the surface of the ground, auxiliary edge-cutting mechanism comprising a rotary sickle mounted in a supporting shoe, means on said shoe cooperating with said rotary sickle to cut vegetation presented thereto, and crop gathering means on said shoe adapted to feed vegetation to said rotary sickle.

CHRIS NEUENSCHWANDER.